United States Patent
Schobloch et al.

(10) Patent No.: US 9,675,197 B2
(45) Date of Patent: Jun. 13, 2017

(54) STEAM COOKER

(75) Inventors: Jochen Schobloch, Bad Buchau (DE); Klaus Roth, Unlingen (DE)

(73) Assignee: SILIT-WERKE GMBH & CO. KG, Riedlingen (DE)

( * ) Notice: Subject to any disclaimer, the term of this patent is extended or adjusted under 35 U.S.C. 154(b) by 1064 days.

(21) Appl. No.: 13/809,688

(22) PCT Filed: Jul. 13, 2011

(86) PCT No.: PCT/EP2011/003501
§ 371 (c)(1),
(2), (4) Date: Mar. 21, 2013

(87) PCT Pub. No.: WO2012/007162
PCT Pub. Date: Jan. 19, 2012

(65) Prior Publication Data
US 2013/0167737 A1     Jul. 4, 2013

(30) Foreign Application Priority Data
Jul. 16, 2010  (DE) .................... 20 2010 010 304 U

(51) Int. Cl.
  *A47J 37/12*  (2006.01)
  *A47J 27/04*  (2006.01)
  *A47J 27/16*  (2006.01)

(52) U.S. Cl.
  CPC .............. *A47J 27/04* (2013.01); *A47J 27/16* (2013.01)

(58) Field of Classification Search
  CPC .......... A47J 27/04; A47J 27/043; A47J 27/06; A47J 27/16; A47J 27/002; A47J 27/05;
  (Continued)

(56) References Cited

U.S. PATENT DOCUMENTS

| 899,244 A | * | 9/1908 | Chase | ..................... A47J 36/20 220/212.5 |
| 2,588,614 A | * | 3/1952 | Capra | ..................... A47J 36/20 99/410 |

(Continued)

FOREIGN PATENT DOCUMENTS

| BE | WO 2007009195 A1 * | 1/2007 | ............. A47J 27/04 |
| CN | 2531851 Y | 1/2003 | |

(Continued)

OTHER PUBLICATIONS

International Search Report for PCT/EP2011/003501, dated Nov. 2, 2011.

(Continued)

*Primary Examiner* — Dana Ross
*Assistant Examiner* — Brandon Harvey
(74) *Attorney, Agent, or Firm* — Marshall, Gerstein & Borun LLP

(57) ABSTRACT

A steam cooker having a lower part, which has raised side walls, wherein the sides walls include two long and two short sides, and which has handles attached to the opposite long side walls so as to be diametrically offset relative to each other, and including a lid, which has a frame, a lid body, a lid handle, and a plurality of openings for pressure equalization, and at least one steam cooking insert to be inserted into the lower part, wherein the steam cooking insert is provided with through-holes for steam to flow through and with handles arranged at an offset.

12 Claims, 4 Drawing Sheets

(58) Field of Classification Search
CPC .......... A47J 27/084; A47J 27/12; A47J 27/13; A47J 27/22166
See application file for complete search history.

(56) References Cited

U.S. PATENT DOCUMENTS

| | | | | |
|---|---|---|---|---|
| 4,106,486 | A * | 8/1978 | Lee .................. | A47J 36/20 126/369 |
| 4,401,017 | A * | 8/1983 | Feld .................. | A47J 36/20 126/369 |
| 4,509,412 | A * | 4/1985 | Whittenburg ........... | A47J 27/04 126/20 |
| 5,086,939 | A * | 2/1992 | Foulkes, Jr. ........... | A47J 27/002 220/759 |
| 5,189,947 | A * | 3/1993 | Yim .................. | A47J 27/04 126/369 |
| 5,387,781 | A * | 2/1995 | Berkoff ............... | A47J 27/04 219/733 |
| 5,992,308 | A * | 11/1999 | Kroscher ............. | A47J 27/002 126/373.1 |
| D470,714 | S | 2/2003 | Kloppsteck | |
| 6,789,683 | B1 * | 9/2004 | Fisher ................ | A47J 36/08 210/465 |
| 2006/0243141 | A1 * | 11/2006 | Mayer ................ | A47J 27/04 99/495 |

FOREIGN PATENT DOCUMENTS

| | | | | |
|---|---|---|---|---|
| DE | 202006005562 U1 | 6/2006 | | |
| DE | AT 9116 U1 * | 5/2007 | .............. | A47J 27/04 |
| GB | 394368 A | 6/1933 | | |
| KR | 101003235 B1 * | 12/2010 | | |
| WO | WO-2006061339 A1 | 6/2006 | | |

OTHER PUBLICATIONS

Notification of First Office Action, The State Intellectual Property Office of P.R. China, Application No. 201180034933.7, dated May 19, 2014.

* cited by examiner

STEAM COOKER

CROSS-REFERENCE TO RELATED APPLICATION

The present application is the United States national phase of International Patent Application No. PCT/EP2011/003501, filed Jul. 13, 2011, which application claims priority of German Application No. 202010010304.5, filed Jul. 16, 2010. The entire text of the priority application is incorporated herein by reference in its entirety.

FIELD OF THE DISCLOSURE

The present disclosure refers to a steam cooker.

BACKGROUND

Known steam cookers are often only useable to a limited extent in small baking ovens due to the shape of the steam cooker and particularly due to the mounting of the handles. Furthermore, with corresponding lids for steam cookers one can often observe the problems that such lids get unintentionally stuck by suction to the edge of the steam cooker or, however, e.g. in the case of an internal pressure inside the steam cooker that is higher than the external pressure of the surroundings, particularly during steam formation in the steam cooker, that an uncontrolled pressure equalization will take place so that an ordinary lid will be moving, clattering or even "dancing" on the steam cooker. Furthermore, during steam cooking attention should be paid to the problem that water vapor that is e.g. condensing on the lid or on the sides should flow back again into the steam cooker. Moreover, due to modern international cooking influences, there is often the desire to carry out multi-level steam cooking. Furthermore, in all modern appliances, particular attention is paid to the energy efficiency of the appliances and system.

SUMMARY OF THE DISCLOSURE

In the light of the above-described problems it is one aspect of the present disclosure to provide a multifunctional steam cooker which exhibits high energy efficiency and the members of which are functionally matched to one another in an efficient manner.

The steam cooker according to the disclosure includes a lower part with raised side walls, wherein the sides walls comprise two long and two short sides, with handles attached to the opposite long side walls so as to be diametrically offset relative to one another; a lid with a frame, a lid body, a lid handle, and a plurality of openings for pressure equalization; and further including at least one steam cooking insert to be inserted into the lower part with raised side walls, the steam cooking insert with handles being arranged at an offset and with through-holes for steam to flow through.

The arrangement of the handles specifically offers advantages for the handling and use of the steam cooker in small-sized baking ovens, whereby the overall length of the lower part, the basic form, of the steam cooker is not additionally increased in size by the handles. Furthermore, this results in an easy handling of the steam cooker, e.g. a good lever if the device has to be carried, as well as easy reachability of the handles. The handles can advantageously be made from suitable, temperature-stable materials. The lower part with raised side walls can here be used in a further function also for preparing roasts or casseroles in the sense of a roaster.

The basic form of the lower part may be rectangular or resemble a rectangle or a mixture of rectangle or oval (ellipse), so that two short and two long sides are created. Furthermore, the form of the lower part with raised side walls may here be trough-shaped or through-like. A corresponding basic form is advantageous for use on commercially available, often oval-(elliptic-)shaped hotplates of modern cooking stoves.

The lower part with the raised side walls of the steam cooker may be made from iron steels with a Silargan coating and typically nickel-plated or chromium-plated pouring edges, or from chromium-nickel steels or chromium steels. In comparison with conventional materials, such as aluminum or copper, these materials withstand heat in an improved way, so that energy can be used more efficiently.

The steam cooking insert may here be stackable; to be more specific, a plurality, e.g. two, steam cooking inserts, may be inserted stacked one on top of the other into the steam cooker. When several steam cooking inserts are used, the height of the steam cooking inserts may be different, whereby the whole height can be used and partitioned in an optimal way. The steam cooking insert may comprise through-holes for steam to flow therethrough in the side walls or in the bottoms or in the side walls and in the bottoms. Due to the offset handles, a special compactness is also accomplished in the steam cooking inserts, similar to the lower part with raised side walls, which compactness may be of particular advantage to the use of the steam cooking inserts in the steam cooker in small-sized baking ovens.

The handles of the steam cooking insert may be arranged particularly in mirrored configuration relative to the handles of the lower part with raised side walls. This improves the ease of handling of the steam cooking insert. Furthermore, the one or plurality of steam cooking inserts may be inserted into or removed from the steam cooker particularly by using e.g. gloves, pot holders or cloths. The mirrored arrangement provides for a special reachability of the handles of the one or plurality of steam cooking inserts.

A steam cooking insert, as has been described above, may further comprise positioning means, particularly for example slots, beads or holes that are suited for the insertion of one or a plurality of divider plates for dividing or partitioning the inserts, so that a plurality of dishes can be cooked in a partitioned form in one cooking process.

Furthermore, the steam cooking insert may advantageously comprise an edge which is formed with an inwardly oriented slope. As a result, especially when the edge projects beyond the lower part with raised side walls of the steam cooker and when a lid is used in addition, condensation water can simply flow back again into the interior.

Typically, the steam cooking insert may comprise a bottom which may have molded therein height levels with e.g. cross-shaped or rectangular profiles, so that the stiffness of the insert is increased on the one hand and that the depositing, moving or pulling of the insert on sensitive surfaces will not scratch said surfaces on the other hand. Typically, the steam cooking insert according to the disclosure may be formed from chromium-nickel steel or chromium steels or other temperature-stable materials. The chromium-nickel steel has the advantage that it is particularly temperature-stable and stainless and can also be employed for applications with temperatures of more than 100° C., e.g. for gratinating.

The lid of the steam cooker according to the disclosure may typically be formed to match the basic form. Particularly, the frame of the lid may be made from silicone, which has the advantage that it is particularly temperature-stable. However, other suitable temperature-stable materials are also conceivable. The one or plurality of openings of the lid can preferably be formed in the side edges of the lid or in the lid body, i.e. for instance at places where the lid rests on the edge of the raised side walls or in the direct vicinity of the support area. The advantage of the openings is that pressure equalization between the surroundings on the one hand and the lid-covered volume on the other hand is rendered possible, so that an overpressure or negative pressure can be prevented and the lid is always positioned in a stable condition and can be lifted with ease at any time. The openings may be slotted or may be in the form of a lancet. Furthermore, the openings may be provided with membranes of a suitable material. The size of the openings is typically optimized with respect to a reduction of the steam exit velocity, so that steam condensation outside the steam cooker, for instance on walls or areas, can be reduced or even avoided.

The lid of the steam cooker may comprise a further opening in the lid, typically in the bulge of the lid, whereby the use of a thermometer insert or of a thermometer is rendered possible, which can e.g. be inserted through said opening. Said opening in the lid may further also be configured to enable pressure equalization. This opening, too, may be additionally equipped with a membrane that permits the insertion of correspondingly shaped inserts, e.g. thermometer. This permits monitoring of the steam cooking temperature and the user can react accordingly at any time when the desired cooking temperature of the dishes has been reached.

The combination of the steam cooker of the disclosure with a plurality of accessories, such as one or a plurality of steam cooking inserts according to the disclosure and a lid according to the disclosure makes it possible to provide a steam cooking system. To be more specific, when two steam cooking inserts according to the disclosure are used together with the lower part according to the disclosure with raised side walls and the lid according to the disclosure, it is possible to provide a double-level steam cooking system.

BRIEF DESCRIPTION OF THE DRAWINGS

Embodiments and combination examples of the disclosure are now explained in more detail with reference to the figures, in which.

DETAILED DESCRIPTION OF THE PREFERRED EMBODIMENT

Figure 1:
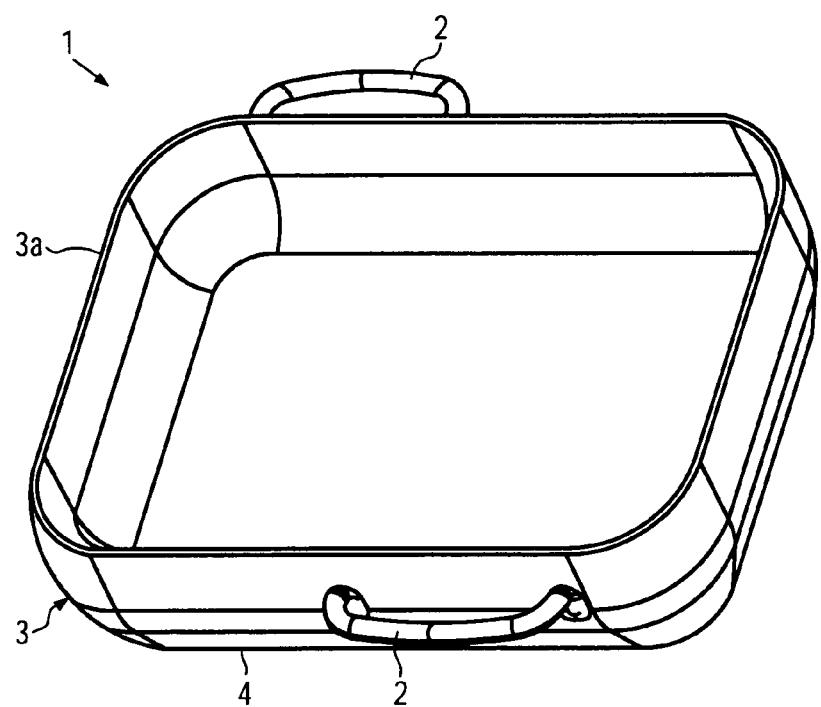
FIG. 1 is a view of the lower part with raised side walls of the steam cooker according to the disclosure.

FIG. 1 shows a steam cooker 1 according to the disclosure. The lower part 3 according to the disclosure with raised side walls 3a forms the basic form 3, 3a of the steam cooker 1. The basic form 3, 3a may have a strong bottom 4 and may be made of iron steels with internally and externally suited coating, e.g. of enamel, such as Silargan, with typically nickel- or chromium-plated pouring edge, or of chromium-nickel steels or chromium steels. The transitions from the bottom 4 of the lower part to the side walls 3a can be gently rounded, as shown in FIG. 1.

FIG. 1 shows handles 2 which are offset relative to one another at two opposite side walls and which may be made from heat-insulating materials. The handles 2 in FIG. 1 are arranged to be diametrically offset relative to one another on the raised side walls of the lower part. It is however also conceivable to integrate the handles into the side walls. As shown in FIG. 2, each individual one of the handles 2 may be molded at two points on the outside of the side walls and may have an oval, circular or straight form of the handle which makes it possible to grip the respective handle with bare hands and also with aids, such as gloves, towels or pot holders. The shape of the steam cooker 1 according to the disclosure, the contour of the bottom 4 of the basic form 3, 3a, is based on the matching to commercially available oval cooking areas and commercially available baking ovens. The basic form 3, 3a of the steam cooker 1 may be rectangular or oval, or a mixture of a rectangle and oval, with bulging side walls and with rounded corners and edges, i.e. trough-shaped or trough-like. FIG. 1 shows the arrangement of the handles 2 on the long sides of the side walls of the basic form 3, 3a of the steam cooker 1 according to the disclosure. This arrangement particularly permits the use of the steam cooker in small-sized baking ovens. The upwardly expanded basic form 3, 3a of the steam cooker 1 according to the disclosure provides enough volume for preparing several portions of dishes with standard dimensions, such as fish, chicken, duck, casseroles, vegetables, etc. The height of the side walls is matched by way of example such that the steam cooking inserts shown in FIGS. 3 and 4 can be combined with the basic form 3, 3a.

FIG. 2 shows a lid 11 according to the disclosure for use with the steam cooker 1 according to the disclosure. The lid may here be adapted to be put or placed on the basic form 3, 3a of the steam cooker 1 according to the disclosure and it may have a support edge 17. Furthermore, the lid 11 may also be put on steam cooking inserts 21 or 31 according to the disclosure, which can be inserted into the basic form 3, 3a, see FIGS. 3, 4 and 6. The lid 11 comprises a frame 12 which may be made from silicone, but other temperature-stable materials can also be used for the frame on condition that they have properties, similar to silicone, that are harmless with respect to the preparation of foodstuff. The frame 12 surrounds the edge portion of the lid base body 13, in short: lid body, which may e.g. preferably be made from glass. Heat-resistant plastics, ceramic materials with metal alloys or suitable combinations of said materials may also be used for the base body; transparent materials may here be of advantage to permit visual inspection. However, the use of a transparent material is not absolutely necessary. The lid base body 13 of the lid 12 can be connected to the frame 12 by means of a casting or sealing compound. The frame can here be produced as a plastic member, e.g. in an injection molding process. When put or placed on the basic form 3, 3*a* of the steam cooker, the lid may be positioned thereon in such a manner that a sealing edge between the lid and the basic form can guarantee the necessary tightness.

Figure 2A:
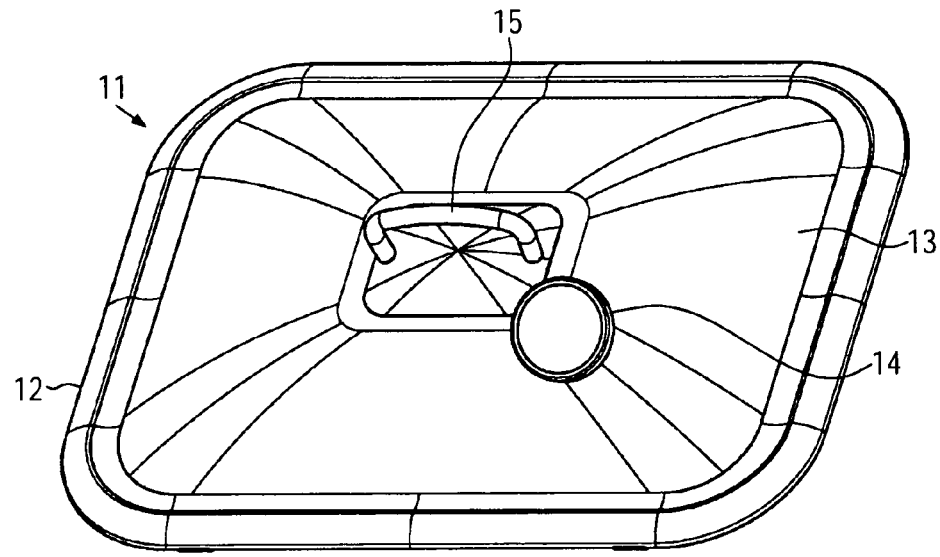
FIG. 2A is a view of a lid according to the disclosure for the lower part of the steam cooker according to the disclosure of FIG. 1.
Figure 2B:
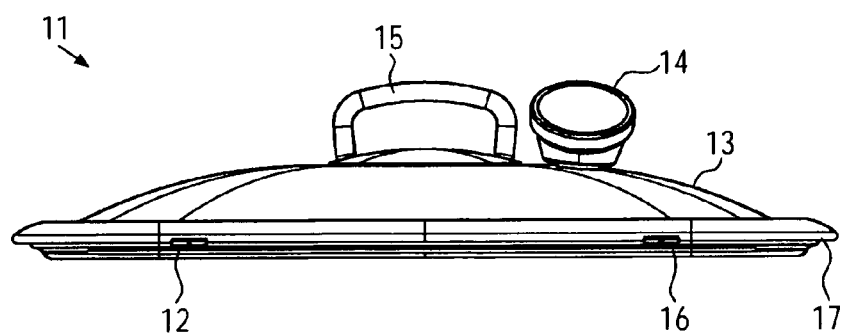
FIG. 2B is a side view of the lid of FIG. 2A.

The lid 11 may have an outwardly curved shape in the case of which a lid handle 15 is typically mounted in the center at the topmost place. The lid handle 15 may be made from heat-insulating material, metal alloys or ceramics and e.g. be fastened in the center of the lid. As shown in FIGS. 2A, 2B, the base body may be reinforced in the area of the lid 11. The lid 11 can be gripped with one hand owing to the handle and can be lifted from the steam cooker according to the disclosure and also be put on it again. The lid 11 in FIGS. 2A, 2B comprises defined places 16 which, when the lid 11 is directly used on the basic form 3, 3*a* and when used in combination with the basic form 3, 3*a* and steam cooking inserts 21 and 31, see FIGS. 3-6, may serve as steam exit openings. The openings 16 are e.g. formed in the edge 17 of the lid 11 with which the lid is placed or seated on the basic form 3, 3*a* or the steam cooking inserts 21, 31, or they are formed in the vicinity of the edge 17, e.g. above or below the edge 17. In the event that the edge 17 is directly seated on the basic form 3, 3*a*, the openings may be formed underneath the edge 17, see FIG. 2A. FIGS. 2A and 2B show four openings 16, two openings being respectively formed in each long side of the lid. The openings 16 in FIGS. 2A and 2B are elongated and slit-like. However, other forms of the openings are also conceivable and their number can also vary. The openings 16 serve to prevent an undesired negative pressure in the state where the lid 11 is mounted on the steam cooker 1; such a negative pressure would impede or aggravate the lifting of the lid 11 from the basic form 3, 3*a*, especially when the previously heated steam cooker is cooling down. When the lid 11 is used in combination with the basic form 3, 3*a* and at least one steam cooking insert 21 or 31, the openings 16 serve as steam exit openings during steam cooking so as to prevent the generation of an excessively high internal pressure. The openings 16 are dimensioned such that the steam velocity is small when steam exits out of the system and condensation in the surroundings of the steam cooker 1 can be reduced or inhibited. The lid 11 may comprise an opening for a thermometer insert 14, i.e. a thermometer. The opening may be formed near the lid handle 15, e.g. near the center of the steam cooker 1.

Figure 3:
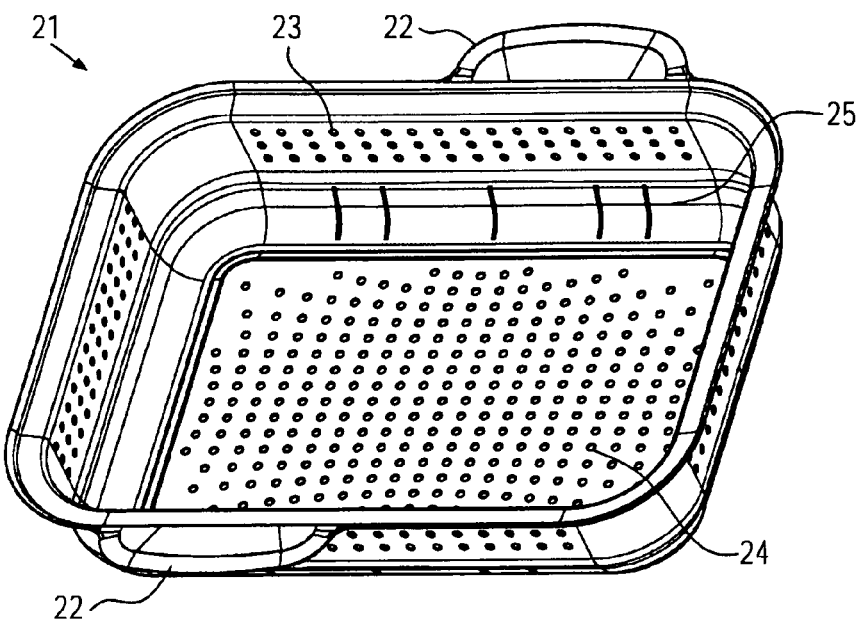
FIG. 3 is a view of a steam cooking insert according to the disclosure for the steam cooker according to the disclosure of FIG. 1.
Figure 4:
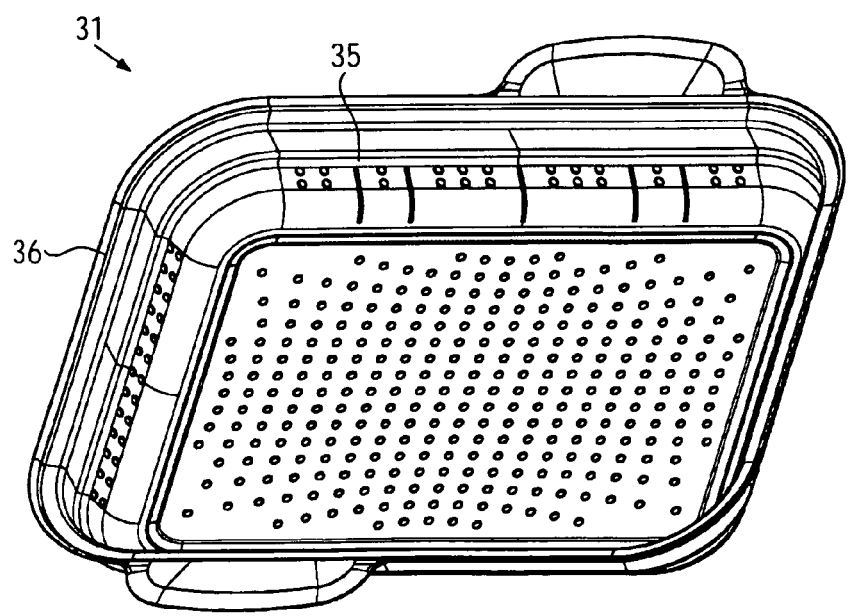
FIG. 4 is a view of a further steam cooking insert according to the disclosure for the steam cooker according to the disclosure.
Figure 5:
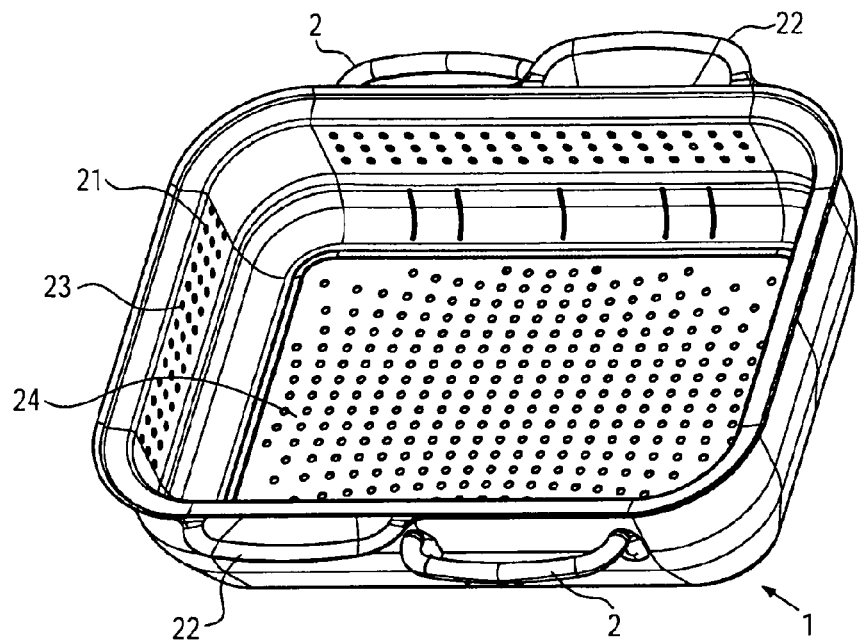
FIG. 5 is a view of the steam cooker according to the disclosure in combination with the steam cooking insert according to the disclosure of FIG. 3.
Figure 6:
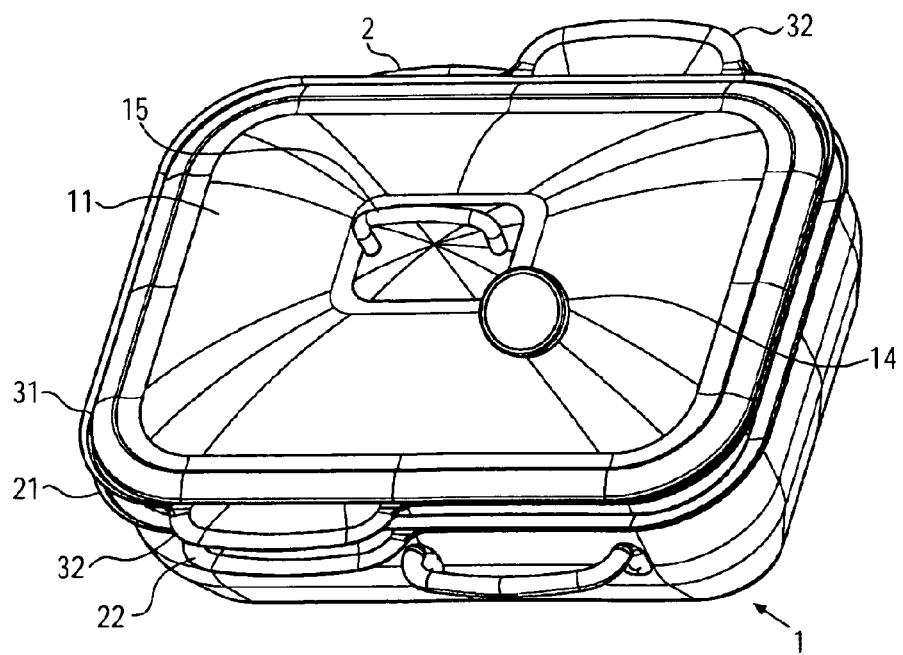
FIG. 6 is a view of the steam cooker according to the disclosure in combination with the steam cooking inserts according to the disclosure of FIG. 3 and FIG. 4, and of the lid according to the disclosure of FIGS. 2A, 2B.

FIGS. 3 and 4 show steam cooking inserts 21 and 31 according to the disclosure, for use in combination with the steam cooker 1 according to the disclosure. FIG. 3 shows a first steam cooking insert 21 with a greater side height than in the case of a second, flatter steam cooking insert 31 in FIG. 4. The steam cooking inserts 21, 31 comprise handles 22 and 32 which substantially conform to the handles 2 of the basic form 3, 3*a* of the steam cooker 1 of the disclosure in their external form. The handles 22, 32 are typically molded on the steam cooking inserts. The position of the handles 22, 32 of the steam cooking inserts 21, 31 may also be offset at two opposite sides. Advantageously, the position of the handles 22, 32, is mirrored, as shown in FIGS. 3 and 4, in comparison with the arrangement of the handles 2 of the basic form 3, 3*a* of the steam cooker 1. The inserts 21, 31 can be lifted with heat protection aids, as has been mentioned above, independently of the basic form 3, 3*a* out of the steam cooker 1. The handles 22, 32 of the steam cooking inserts 21, 31 may be made from heat-insulating material or metal alloys. The steam cooking inserts 21, 31 are provided on their respective top edges with outwardly bulging edges that permit the insertion, placement or attachment in the basic form 3, 3*a* of the steam cooker 1. The outer edges of the steam cooking inserts 21, 31 may be formed such that they are rounded off. The edges permit the placing or positioning of the lid 11. The steam cooking inserts 21, 31 comprise through-holes, e.g. holes in the bottom, 24, and in the sidewalls, 23, which enable steam vapor to flow therethrough. Likewise, e.g. condensation water or liquids exiting out of dishes (vegetables) can flow back through said openings into the basic form. One or a plurality of steam cooking inserts 21, 31 may be combined and stacked together with the basic form 3, 3*a* of the steam cooker 1. The edge of the steam cooking inserts 21, 31 is here high enough so that each insert can be lifted individually out of the basic form 3, 3*a* or out of an insert inserted thereunder. Furthermore, the inserts 21, 31 may be covered with the lid 11. It is thereby possible to combine a steam cooking system, as shown in FIG. 5, or a double-level steam cooking system, as shown in FIG. 6, with or without lid 11. For the simultaneous preparation of different dishes, vegetables, side-dishes, etc., as desired by the user, one or a plurality of divider plates (not shown) may be inserted at suitable positions 25, 35 into the steam cooking inserts 21, 31. Suitable slots or beads or holes may serve the positioning of the divider plates, see FIGS. 3-5. The dividers have e.g. half the height up to the full height based on the height of the steam cooking inserts 21, 31, as outlined by the positions (slots) shown in FIGS. 3 to 5, with a maximum height of the dividers, for instance, ensuing from the maximum distance of the respective bottoms of the steam cooking inserts 21 and 31 during use as a double-level steam cooking system.

For the steam cooking inserts 21, 31, the edge 36 projecting over the basic form 3, 3*a* may be formed with inwardly oriented slope, so that water condensing on the lid 11 can flow back into the interior of the steam cooking system. The bottom of the steam cooking inserts 21, 31 is, as shown in FIGS. 3 and 4, formed into height levels, thereby enabling a reliable movement of the steam cooking inserts 21, 31 on sensitive surfaces. The steam cooking inserts 21, 31 consist e.g. of chromium-nickel steels or chromium steels, but it is also possible to use other suitable materials that withstand the high water content and temperature range during steaming and are suited for use with foodstuff. The material chromium-nickel steel permits the use of an insert 21, 31 as a container for dishes that are to be prepared under conditions differing from the steam cooking conditions or if a further preparation step, for instance gratinating, is desired subsequent to a cooking process, wherein temperatures of more than 100° C. may occur. Hence, additional applications are possible for the steam cooking inserts 21, 31 after termination of a cooking process or even without the basic form 3.

It goes without saying that features mentioned in the above-described embodiments are not restricted to these special combinations and are also possible in any desired other combinations. To be more specific, the shapes of the through-holes/openings in the steam cooking inserts may have different forms or geometries.

What is claimed is:
1. A steam cooker comprising:
a lower part, which has raised side walls, wherein the side walls comprise two long and two short sides, and wherein handles are attached offset relative to one another to be diagonally opposite at the two opposite long side walls such that a first one of the handles, attached to the first long side wall, is closer to the first short side wall and a second one of the handles, attached to the second long side wall, is closer to the second short side wall;

a lid, which has a frame, a lid body, a lid handle, and a plurality of openings for pressure equalization, and at least one steam cooking insert to be inserted into the lower part, wherein the steam cooking insert is provided with through-holes for steam to flow through and with handles arranged diagonally offset relative to one another at two opposite long side walls, wherein the position of the handles of the steam cooking insert is mirrored with respect to the position of the handles of the lower part such that the first handle of the steam cooking insert, attached to the first long side wall of the steam cooking insert corresponding to the first long side wall of the lower part, is closer to the second short side wall and the second handle of the steam cooking insert, attached to the second long side wall of the steam cooking insert corresponding to the second long side wall of the lower part, is closer to the first short side wall.

2. The steam cooker according to claim 1, wherein the through-holes for steam to flow through are formed in the side walls or in the bottom.

3. The steam cooker according to claim 1, wherein the steam cooking insert is stackable.

4. The steam cooker according to claim 1, wherein the steam cooking insert further comprises slots or beads or holes serving the positioning of one or a plurality of divider plates.

5. The steam cooker according to claim 1, wherein the steam cooking insert is made from chromium-nickel steels or chromium steels.

6. The steam cooker according to claim 1, wherein the steam cooking insert comprises a bottom having molded therein profiles for increasing stiffness of the steam cooking insert and preventing scratches on a sensitive surface when depositing, moving or pulling the steam cooking insert on the sensitive surface.

7. The steam cooker according to claim 1, wherein the steam cooking insert comprises an edge with an inwardly oriented slope.

8. The steam cooker according to claim 1, wherein the frame of the lid is made from silicone.

9. The steam cooker according to claim 1, wherein the plurality of openings of the lid are formed in the side edges of the lid or in the lid body.

10. The steam cooker according to claim 9, wherein the openings of the lid are slotted.

11. The steam cooker according to claim 8, wherein the openings of the lid are provided with membranes.

12. The steam cooker according to claim 1, comprising an opening in the lid body which is configured to put a thermometer insert or a thermometer therethrough or for pressure equalization, wherein the opening is formed near the lid handle.

* * * * *